United States Patent [19]

Blankenship

[11] 4,165,592
[45] Aug. 28, 1979

[54] CABLE DIRECTING APPARATUS

[76] Inventor: Roy L. Blankenship, 230 Manassas Dr., Manassas Park, Va. 22110

[21] Appl. No.: 871,842

[22] Filed: Jan. 24, 1978

[51] Int. Cl.$^2$ ............................................. E04B 5/48
[52] U.S. Cl. ..................................... 52/220; 285/156
[58] Field of Search .................. 52/220, 221; 285/156

[56] References Cited

U.S. PATENT DOCUMENTS

| | | | |
|---|---|---|---|
| 286,939 | 10/1883 | Martin | 174/50 |
| 1,913,192 | 6/1933 | Cook | 52/221 |
| 1,986,122 | 1/1935 | Sargent | 52/221 |
| 2,062,289 | 12/1936 | Bennett | 307/156 |
| 2,824,578 | 2/1958 | Blinn et al. | 52/221 |
| 3,287,566 | 11/1966 | Lang et al. | 307/17 |
| 3,341,718 | 9/1967 | Acker | 307/157 |
| 3,580,982 | 5/1971 | Havewala | 174/45 |
| 3,841,032 | 10/1974 | Grannis | 52/27 |
| 3,936,589 | 2/1976 | Teeters et al. | 174/65 R |

*Primary Examiner*—James L. Ridgill, Jr.
*Attorney, Agent, or Firm*—James A. Wong

[57] ABSTRACT

Apparatus through which electrical cables of an underground distribution system may pass from a generally horizontal plane to a generally vertical plane so as to be directed upwardly for connection with terminals of an above ground transformer comprising:

a hollow generally horizontal portion;

a hollow generally vertical portion integral with the hollow generally horizontal portion, the hollow generally horizontal portion having at least one end with a first opening, the hollow generally vertical portion having an upper end with a second opening, the hollow generally horizontal and vertical portions intersecting each other at a lower end of the generally vertical portion to provide communication between the first and second openings through the generally horizontal and vertical portions; and an arcuate guide member extending within the generally horizontal portion and including a lower section merging into a lower surface or floor of the generally horizontal portion, the arcuate guide member extending from the lower surface or floor for about 90° and forming a concave surface whereby any cable inserted into the first opening will upon coming into contact with the guide member be directed upwardly toward the second opening.

8 Claims, 6 Drawing Figures

CABLE DIRECTING APPARATUS

BACKGROUND OF THE INVENTION

1. Field of the Invention

This invention is directed to an apparatus for use with an underground electric power cable system and which is to be used at the point where a plurality of cable members change direction from a generally horizontal position below the ground surface to a generally vertical position and emerge to above ground level for connection to the terminals of a transformer to supply the electrical power requirements of the consumer. In particular, this invention relates to a shield-and-guide member through which electrical cables are inserted and extend during transition from a generally horizontal position to a generally vertical position. Moreover, this apparatus relates to an apparatus for use with cables which may be coming from more than one direction toward a transformer for connection therewith.

2. Description of the Prior Art

The prior art devices include conduits of various shapes and sizes. Some of the prior art devices also incorporate cable separators having separate holes through which each cable must be fed and generally confine and restrict the cables fed therethrough.

SUMMARY OF THE INVENTION

With the background of the invention as outlined above, it may be summarized as a new and improved cable directing apparatus for use in laying cables in an underground electrical system and in particular where such cables are to change direction and emerge from the underground position and rise above ground for connection to a transformer.

A principal object of this invention is to provide a new and improved cable directing apparatus which will readily effect a change in direction of a cable in an underground cable system.

Another object of this invention is to provide a new and improved apparatus which underground cables may be readily fed to a foundation base pad for a transformer.

Still another object of this invention is to provide a new and improved apparatus through which relatively stiff cables may be inserted and afforded adequate space for flexing to and fro as to facilitate connection with transformer terminals.

Yet another object of this invention is to provide a new and improved apparatus through which underground cables coming from opposite directions may be inserted and be redirected upwardly for connection with the terminals of a transformer.

A further object of this invention is to provide a new and improved cable guiding apparatus including a portion which may be located in a slot formed in a cast concrete foundation base pad upon which a transformer is to be mounted.

An additional object of this invention is to provide a new and improved cable guiding apparatus which includes an underground portion which is of optimum shape for sustaining dirt disposed thereon without collapsing under the weight thereof.

DETAILED DESCRIPTION OF THE INVENTION

Figure 1:
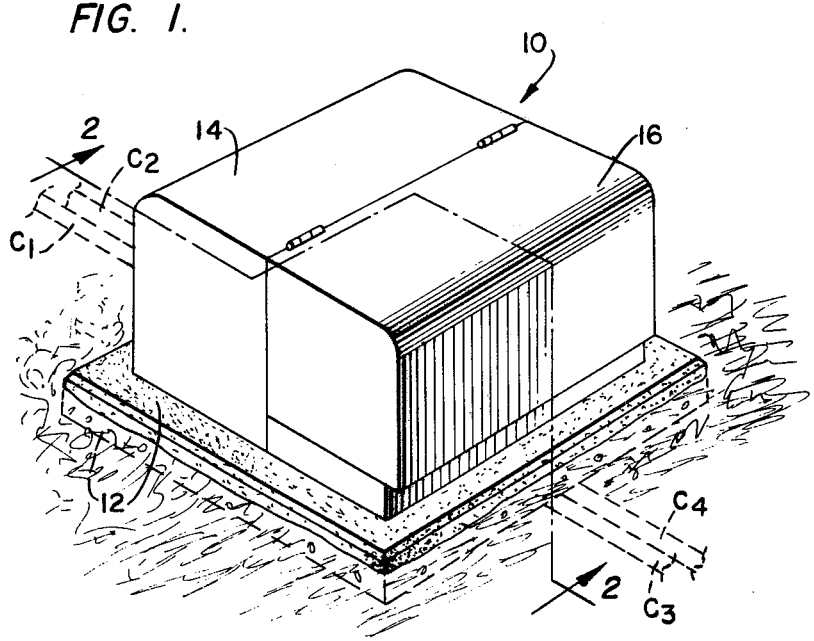
FIG. 1 is a view in perspective of a transformer with which the cable directing apparatus of the present invention may be used.
Figure 2:
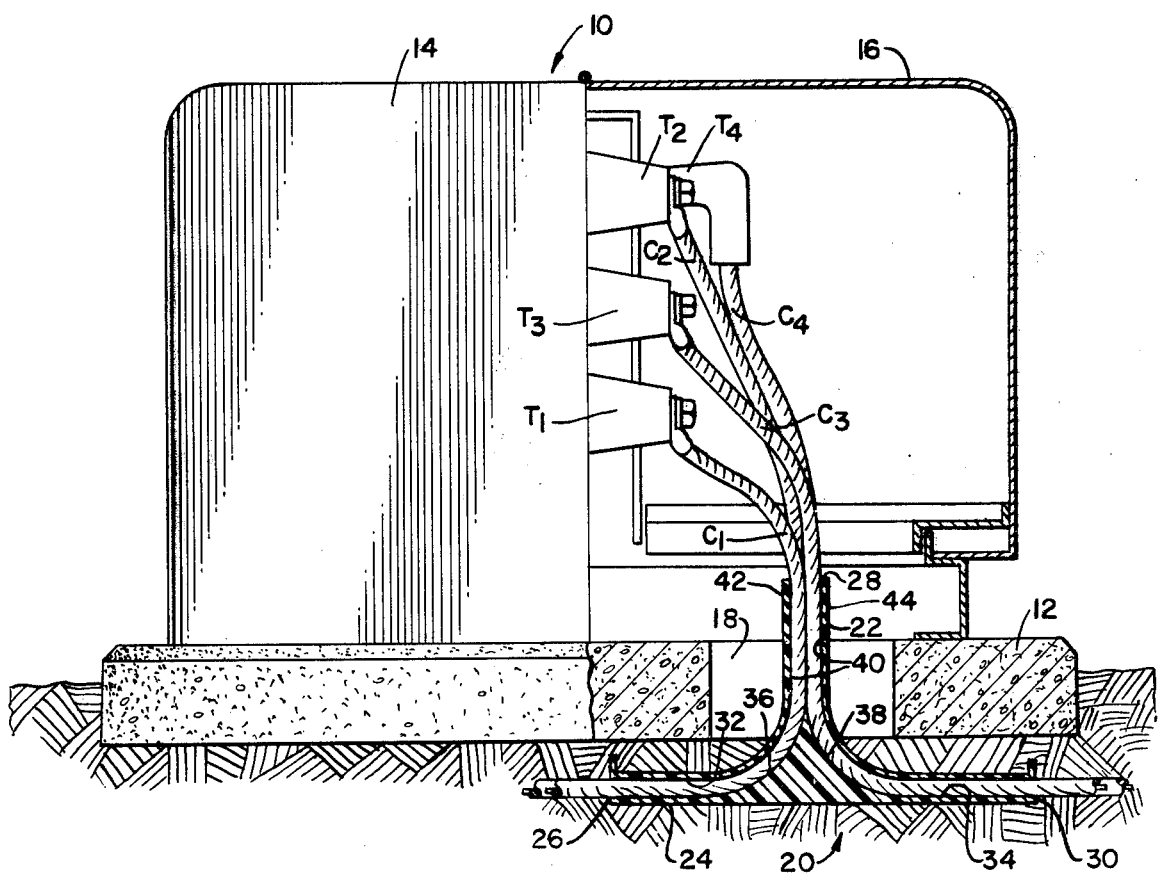
FIG. 2 is a view taken along the section 2—2 looking in the direction of the arrows.
Figure 3:
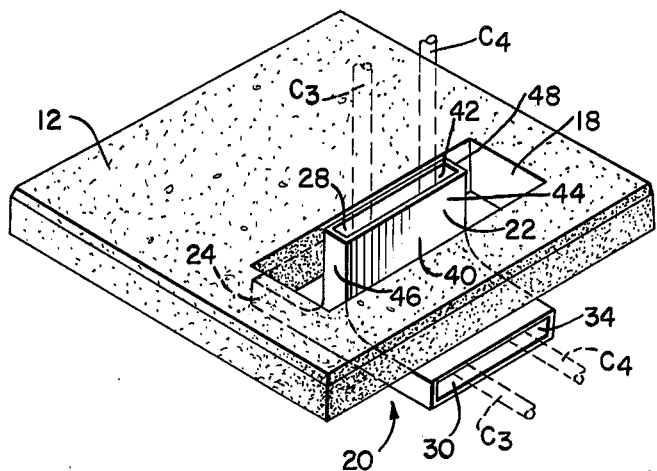
FIG. 3 is a view in perspective of the cable directing apparatus according to the present invention and foundation base plate appearing in FIGS. 1 and 2 before the transformer is mounted thereon.

Referring now in particular to the drawings, the reader will readily appreciate the present invention with consideration of FIGS. 1-3 in which a transformer 10 is mounted on a pre-cast concrete foundation base pad 12 under which portions of underground electrical cables $C_1$, $C_2$, $C_3$, and $C_4$ extend. Transformer 10 includes fixed housing portion 14 and a hinged cover portion 16 and terminals $T_1$, $T_2$, $T_3$, and $T_4$ to which cables $C_1$, $C_2$, $C_3$, and $C_4$, respectively, are connected. Foundation base pad 12 includes a slot 18 to facilitate passage of cables $C_1$, $C_2$, $C_3$, and $C_4$ for connection to transformer 10.

As may be readily seen in FIGS. 2 and 3, the cable directing apparatus 20 is a one-piece, self-contained apparatus generally in the shape of an inverted T with one member 22 having a generally rectangular cross section extending upwardly from a second member 24. Member 24 also having a generally rectangular cross section is disposed both below ground level and below the foundation base pad 12 with member 22 extending upwardly and at least into slot 18. Member 24 includes a first end and a second end while member 22 includes an upper end and a lower end, wherein a first opening 26, and upwardly directed second opening 28, and a further opening 30 are provided at the first end of member 24, at the upper end of member 22, and at the second end of member 24, respectively. Member 24 is also seen to comprise hollow generally horizontal portions 32 and 34 extending centrally thereof from first opening 26 and third opening 30, respectively. Horizontal portions 32 and 34 instead of being continuous along a horizontal plane each pass through arcuate transition guide members 36 and 38, respectively, and merge into a hollow generally vertical portion 40 to both communicate with second opening 28 at the upper end of member 22. From FIG. 2, it is further seen that vertical portion 40 intersects horizontal portions 32 and 34 at the lower end of vertical portion 40 intermediate openings 26 and 30 of horizontal portions 32 and 34. Arcuate guide member 36 subtends an arc of at least 90° extending from a lower surface or floor of horizontal portion 32 to provide a concave surface whereby any cable $C_1$ or $C_2$ inserted into opening 26 will upon coming into contact with guide member 36 automatically be directed upwardly toward opening 28. Arcuate guide member 38 like arcuate guide member 36 also subtends an arc of at least 90° extending from a lower surface or floor of horizontal portion 34 to provide a concave surface directed toward opening 30 whereby any cable $C_3$ or $C_4$ inserted therein will upon coming into contact with guide member 38 automatically be directed upwardly toward opening 28. From the foregoing construction, it is clear that cables $C_1$, $C_2$ or $C_3$, $C_4$ entering cable directing apparatus 20 from either of two directions through opening 26 or 28 can and will upon coming into contact with arcuate guide members 36 or 38, respectively, automatically be diverted from the generally horizontal path to a generally vertically path. Hollow vertical portion 40 as seen in FIGS. 2 and 3 is partially defined by a first wall 42 and a second wall 44 extending generally parallel to each other and upwardly from horizontal portions 32 and 34 with first wall 42 being closer to opening 26 and with second wall 44 being closer to opening 30. Side walls 46 and 48 connect first and second walls 42 and 44 on opposite sides thereof and thus completely define hollow vertical portion 40 with opening 28 at the upper end thereof. According to the inventive concept of the present invention, first and second walls 42, 44 are spaced apart from each other to the extent that any cable segment extending through hollow vertical portion 40 may be moved toward or away from both first and second walls 42 and 44 and side walls 46, 48 are spaced apart from each to the extent that any cable segment extending through hollow portion 40 may be moved toward or away from either of the side walls 46, 48 to enable flexing of such cable segment and thereby facilitate connection with a transformer terminal regardless of cable rigidity. In the embodiment of the invention illustrated in FIGS. 2 and 3, openings 26, 28, and 30 are all generally rectangular with openings 26 and 30 having transverse dimension on the order of twenty-four inches and a vertical dimension on the order of three inches while opening 28 has a dimension on the order of twenty-four inches between side walls 46, 48 and a dimension on the order of six inches between first and second walls 42, 44. Cables $C_1$, $C_2$, $C_3$, $C_4$ for which cable directing apparatus 20 is provided each have a diameter of at least one inch.

Figure 4:
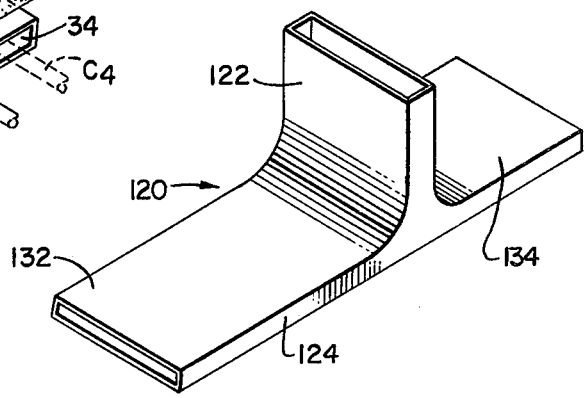
FIG. 4 is another view in perspective of an alternative form of the cable directing apparatus according to the present invention.
Figure 5:
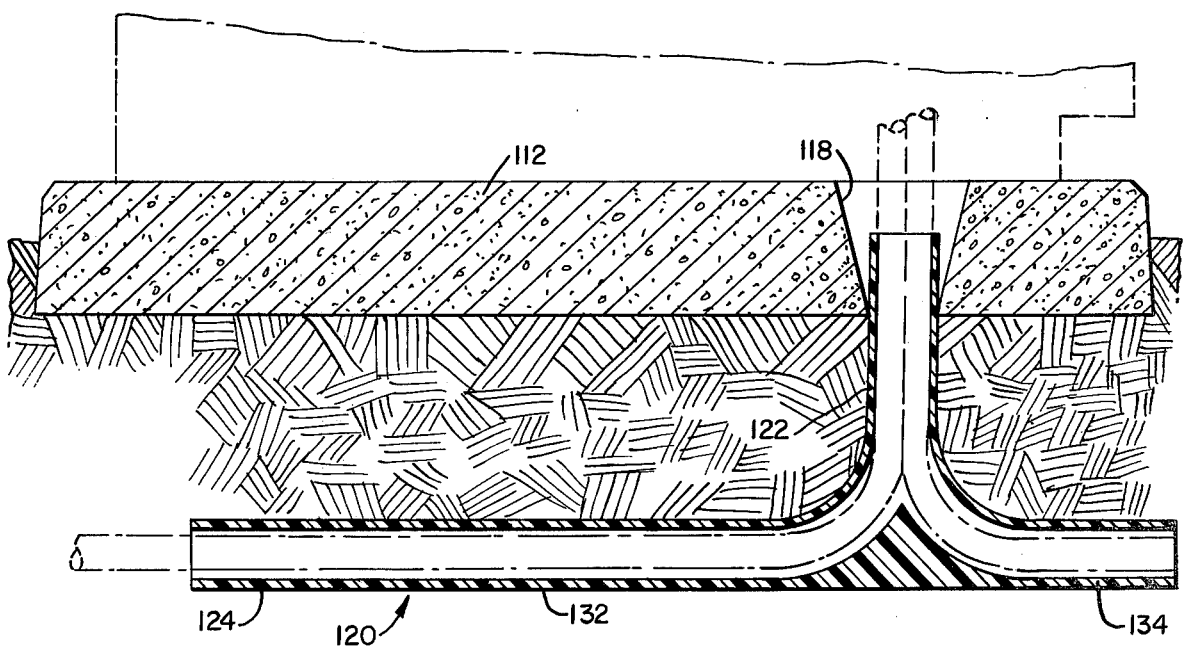
FIG. 5 is a side elevational section view of the cable directing apparatus of FIG. 4 illustrated in combination with a different foundation base pad from that of FIGS. 1-3.

In an alternative form of the present invention, the disclosed cable directing apparatus 120, as illustrated in FIGS. 4 and 5, is embodied with a vertical member 122 extending upwardly from a horizontal member 124 farther from one end thereof than from the other end thereof so that one hollow horizontal portion 132 is longer than the other hollow horizontal portion 134. The longer portion 132 ordinarily would be disposed beneath the foundation base pad 112 to facilitate insertion of cables therein from a remote side of the pad 112. Slot 118 is shown to diverge from the lower side of pad 112 to the upper side thereof, but it is to be understood that the slot may have parallel sides as in the pad 12 of FIGS. 2 and 3.

Figure 6:
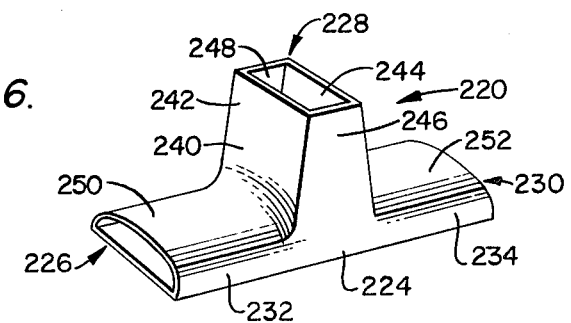
FIG. 6 is a view in perspective of still another alternative embodiment of the cable directing apparatus according to the present invention.

In another alternative form of the present invention, the disclosed cable directing apparatus 220, as illustrated in FIG. 6, is embodied with each of the hollow horizontal portion 232, 234 having a substantially flat lower surface or floor extending continuously from respective openings 226, 230 to opening 228 in the hollow vertical portion 240. Each of the hollow horizontal portions 232, 234 also include arcuate roofs 250, 252, respectively, on opposite sides of the hollow vertical portion 240 to provide concave inner surfaces and convex outer surfaces whereby the outer convex or bowed surface will be characterized by an inherent resistance to sagging when dirt is disposed thereon. Hollow vertical portion 240, as clearly seen in FIG. 6, include first and second walls 242, 244 which converge toward each other in the direction from where they are integral with arcuate roofs 250, 252, respectively, to opening 228 at the upper end of vertical portion 240. Side walls 246, 248, which connect first and second walls 242, 244 at opposite sides thereof, are substantially parallel to each other and cooperate with first and second walls 242, 244 to define opening 228 so as to be generally rectangular in shape. The openings 226, 230, because of the arcuate roofs 250, 252 and substantially flat lower surface or floor, are generally in the shape of a bow for shooting an arrow. The openings 226, 228, and 230 each have a dimension on the order of twenty-four inches in the direction transversely of the longitudinal extent of horizontal member 224. The maximum height of openings 226 and 230 is on the order of three inches with the horizontal dimensions between walls 242, 244 defining opening 228 being on the order of eight inches.

Consistent with the various objects enumerated above, the cable directing apparatus disclosed herein effectively functions as a shield for underground electrical cables in the vicinity of above-ground transformers or the like to which such cables are to be connected and more importantly functions to direct cables inserted therein from the generally horizontal position through a transition position and to a generally vertical position up to the terminals of a transformer or the like to supply the requirements of consumers. From the disclosed construction as illustrated in the accompanying drawings and described above, it is clear that the cables, which are of considerable rigidity, are afforded sufficient slack and maneuverability that the cable ends are readily shiftable to and fro fro connection to the terminals of a transformer or the like.

In practice the cable directing apparatus as disclosed herein, whether it be embodied in the form designated 20, 120, or 220 in the above drawings, should be made, for example, of polyvinyl chloride at about a quarter of an inch in thickness.

It will be obvious to those skilled in the art that various changes may be made without departing from the scope of the invention and the invention is not to be considered limited to what is shown in the drawings and described in the specification.

What is claimed is:

1. A one-piece, self-contained, inverted T-shaped cable-directing apparatus through which electrical cables of an underground distribution system may pass from a generally horizontal plane to a generally vertical plane so as to be directed upwardly for connection with terminals of an above ground transformer comprising:

a hollow generally horizontal portion having a generally rectangular cross section with a flat lower surface or floor;

a hollow generally vertical portion integral with said hollow generally horizontal portion and also having a generally rectangular cross section, said hollow generally horizontal portion having one end with a first opening, said hollow generally vertical portion having an upper end with an upwardly directed opening, said hollow generally horizontal and vertical portions intersecting each other at a lower end of said generally vertical portion to provide communication between said first and second openings through said generally horizontal and vertical portions, said hollow generally horizontal portion also having a second end with a further opening, said hollow generally horizontal and vertical portions intersecting each other at said lower end of said generally vertical portion intermediate said first and second ends of said generally horizontal portion to also provide communication between said upwardly directed and said further openings through said generally vertical and horizontal portions;

an arcuate guide member extending within said generally horizontal portion and including a lower section merging into said lower surface or floor of said generally horizontal portion, said arcuate guide member extending from said lower surface or floor from both directions for about 90° and forming a first concave surface whereby any cable inserted into said first opening will upon coming into contact with said guide member be directed upwardly toward said upwardly directed opening and a second concave surface whereby any cable inserted into said further opening will upon coming into contact with said guide member be directed upwardly toward said upwardly directed opening, said hollow generally vertical portion including a first wall and a second wall extending upwardly from said hollow generally horizontal portion with said first and second walls being connected to each other by side walls on opposite sides thereof to define said hollow generally vertical portion and said upwardly directed opening, said first and second walls being spaced apart from each other to the extent that any cable segment extending therethrough may be moved toward or away from said first and second walls and said side walls being spaced apart from each other to the extent that any cable extending therethrough may be moved toward or away from either of said side walls to enable flexing of such a cable segment and thereby facilitate connection with a transformer terminal regardless of cable rigidity.

2. The apparatus as defined in claim 1, wherein said first, upwardly directed, and further openings are generally rectangular with said first and further openings each having a vertical dimension of about three inches and a transversely extending horizontal dimension of about twenty-four inches and said upwardly directed opening having a transversely extending horizontal dimension of about twenty-four inches and a second horizontal dimension of about eight inches extending between said first and second walls.

3. The apparatus as defined in claim 1, wherein said lower surface or floor which is substantially flat extends continuously from said first opening to said further opening and said hollow generally horizontal portion also includes arcuate roofs on opposite sides of said hollow generally vertical portion providing concave inner surfaces and convex outer surfaces.

4. The apparatus as defined in claim 3, wherein said first and second walls of said hollow generally vertical portion converge toward each in the direction from said hollow generally horizontal portion to said upwardly directed opening.

5. The apparatus as defined in claim 4, wherein said side walls are substantially parallel to each other.

6. The apparatus as defined in claim 5, wherein said upwardly directed opening is generally rectangular and said first and further openings are each generally in the shape of a bow for shooting an arrow.

7. The apparatus as defined in claim 6, wherein said first, upwardly directed, and further openings have a transversely extending horizontal dimension of about twenty-four inches.

8. The apparatus as defined in claim 7, wherein said first and further openings have a height of about three inches and said upwardly directed have a further horizontal dimension of about eight inches between said side walls.

* * * * *